United States Patent [19]
Pavlath et al.

[11] Patent Number: 5,214,487
[45] Date of Patent: * May 25, 1993

[54] FIBER OPTIC GYRO

[75] Inventors: George A. Pavlath, Thousand Oaks, Calif.; Byoung Y. Kim, Seoul, Rep. of Korea

[73] Assignee: Litton Systems, Inc., Beverly Hills, Calif.

[*] Notice: The portion of the term of this patent subsequent to Jul. 3, 2007 has been disclaimed.

[21] Appl. No.: 521,951

[22] Filed: May 11, 1990

[51] Int. Cl.⁵ .............................. G01C 19/72
[52] U.S. Cl. ................... 356/350; 356/345; 385/14
[58] Field of Search ............... 356/350, 345; 350/96.12, 96.14

[56] References Cited

U.S. PATENT DOCUMENTS 4,938,594  6/1990  Pavlath .............................. 356/350

Primary Examiner—Samuel A. Turner
Assistant Examiner—LaCharles P. Keesee
Attorney, Agent, or Firm—James F. Kirk

[57] ABSTRACT

An inexpensive fiber optic gyro using a fiber optic sensing coil that is fed from two single-mode light carriers such as an optical waveguide or optical fibre. The light carriers obtain their energy, through a mode splitter, from a double-mode light carrier. The double-mode carrier is, in turn, energized by an at least partially coherent light source through a single-mode light carrier. The light source is preferably a laser. Detectors are attached to light carriers which tap different predetermined positions along the double-mode waveguide to produce substantially sinusoidal signal functions of sensed rotation.

8 Claims, 1 Drawing Sheet

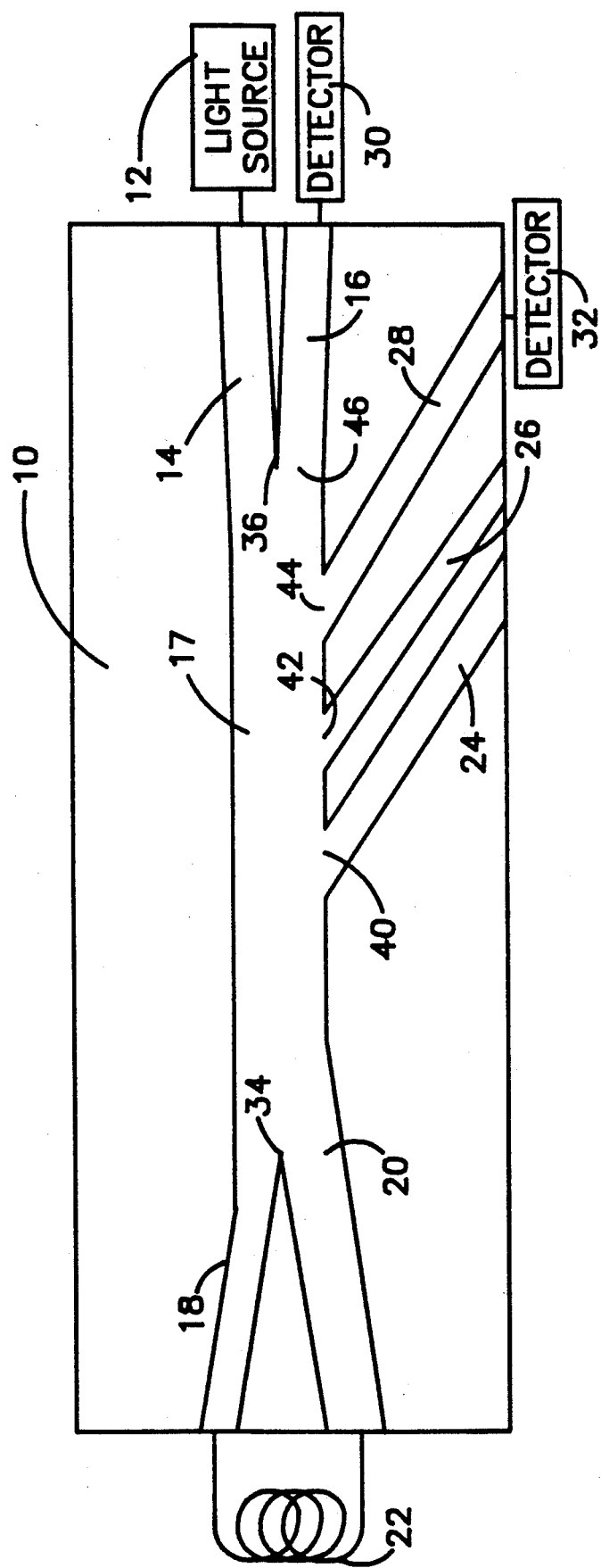

FIBER OPTIC GYRO

BACKGROUND OF THE INVENTION

1. Pertinent Prior Art of Interest

To obtain sufficient accuracy, prior fiber optic gyros required a phase modulator and demodulator. For example, U.S. Pat. No. 4,410,275 which issued to H. J. Shaw, et. al on Oct. 18, 1983 for a FIBER OPTIC ROTATION SENSOR teaches the use of a modulator to phase modulate the counterpropagating waves in the fiber sensing coil about the Sagnac phase shift to increase the sensitivity of the instrument and to determine the direction of rotation of the instrument. The modulation occurs by modulating the length or refractive index of the fiber. A relative phase difference is produced in the counterpropagating waves by the difference in propagation time through the fiber loop as the loop turns. An output detector demodulates the signal to provide a measure of the angular rate of the sensing loop.

U.S. Pat. No. 4,468,085 issued Aug. 28, 1984 for a "Hybrid Optical Junction and Its Use in a Loop Interferometer" to Michel Papuchon, et al. See particularly FIGS. 2 and 6. The apparatus of the patent uses single mode fibers. FIG. 6 shows an embodiment wherein light from a light source 10 is delivered into a single mode fiber 2 which is one of a pair of substantially identical single-mode fibers. The light travels along the fiber 2, thence into a common single mode fiber. Light from the common single mode fiber is delivered, usually equally, into two substantially identical fibers, 6 and 7, then through fibers 26 and 30 into the angular sensing coil. Light emerges from the sensing coil and is delivered by leaders 30 and 26 back into fibers 6 and 7, thence into the common fiber. The common fiber delivers light into the fibers 2 and 3. It is detected by the detector 12 at 3.

2. Brief description of the Invention

The fiber optic gyro of this invention eliminates the modulator and demodulator found in state-of-the-art fiber gyros, and it is therefore inherently less expensive and less complex to manufacture.

Although the apparatus of the invention is described using optical waveguides mounted upon a substrate, it may use equivalent light carriers such as optical fibers.

First and second single-mode optical waveguides, substantially identical in cross section and length, are symmetrically coupled to a first end of a double-mode optical waveguide. The angles formed between the center lines of the first or second single mode guides and the center line of the duo-mode guide are large enough to separate the single mode guides, but should be as small as practical.

Third and fourth dis-similar single-mode optical wave guides are coupled to the second end of the double-mode optical waveguide to form mode splitters for splitting the two modes received from the duo-mode waveguide. The mode splitters are attached, as explained in an article entitled, "An analytic Solution for Mode Coupling in Optical Waveguide Branches" by William K. Burns, et. al., which appeared in the IEEE Journal of Quantum Electronics, Vol QE-16, No. 4, April 1980. The third and fourth waveguides are of different dimensions and depart at different angles from the double-mode waveguide.

A light source, preferably of coherent light or partially coherent light, is properly polarized to deliver, and delivers, light to the first waveguide. The first waveguide delivers single-mode light to the double-mode waveguide to excite both the fundamental and the second modes of the waveguide. The double-mode waveguide delivers the fundamental mode of energy to excite the fundamental mode of the fourth waveguide and delivers its second mode of energy to excite the fundamental mode of the third waveguide. The third and fourth waveguides deliver light to and receive light from opposite ends of a single mode optical-fibre rate-sensing coil.

The two signals travel from the third and fourth waveguides, through the sensing coil from one end to the other and depart, respectively, through the fourth and third waveguides. The returning signal in the third waveguide excites the returning fundamental mode in the duo-mode waveguide, and the returning signal in the fourth waveguide excites the returning second mode in the duo-mode waveguide.

The two modes in the double-mode waveguide travel at different speeds. If the two modes were to travel only the length of the guide, then reverse their direction, they would arrive back at the beginning of the guide in phase.

With the sensing coil, the relative phase of the two signals at the beginning of the duo-mode guide depends upon the sensed angular rate. The returning signal arriving at the first end of the double-mode waveguide, delivers part of the returned energy of each mode to the second waveguide and thence to an optical sensor.

Along the double-mode waveguide are positioned waveguide taps to extract energy from the double-mode waveguide. Preferably these taps are each positioned to extract, usually through single-mode waveguides, substantially equal amplitudes of light from the two modes within the waveguide. The extracted light is guided to additional detectors.

In one preferred embodiment, the distance between the entrances to two of the waveguides is substantially plus or minus multiples of pi, plus one-quarter of the beatlength (Dr. Kim define beatlength) between the two modes in the waveguide. With that spacing, the electrical signals from the two detectors are proportional to the sine and cosine of the angle sensed by the sensing coil. If the electro-magnetic fields within the waveguides were not disturbed by the additional taps, by the angles of injection and extraction of the light, and other disturbances within the waveguides, the optimum spacing between such entrances to the waveguides could be exactly multiples of pi, plus a quarter wavelength. However, with such disturbances, the exact position of the detectors for optimum performance needs to be determined by experiment.

It is therefore a feature and object of this invention to sense rotation and to produce signals that are measures of such sensed rotation.

Other features and objects will become apparent from the following description taken together with the accompanying drawing.

BRIEF DESCRIPTION OF THE DRAWING

The only drawing is a plan of an optical waveguide connected to an optical-fiber sensing coil, a light source, and detectors according to this invention.

DETAILED DESCRIPTION OF THE PREFERRED EMBODIMENT

A plurality of light waveguides 14, 16, 17, 18, 20, 24, 26, 28 are fabricated on a substrate 10. The single-mode waveguides 14 and 16 are substantially identical, and they are coupled at 36 to one end of the double-mode waveguide 17. The second end of the waveguide 17 is mode coupled at 34 to two different sized single-mode waveguides 18 and 20. The other ends of waveguides 18 and 20 are coupled to opposite ends of a fiber optical angle sensing coil 22. Additional waveguides 24, 26 and 28 are coupled at various positions to the waveguide 17. Distance between the entrances 46 and 44 of waveguides 16 and 28 is multiples of half a wavelength of the light, plus one quarter of the wavelength of the light. A source of coherent light or partially coherent light, preferably a laser 12, delivers light in a single mode to the waveguide 14.

In operation, light travels from source 12 into the single mode guide 14 dto the junction 36 where it excites both modes of the double-mode waveguide 17. The double mode light travels along the double-mode waveguide 17 to the mode-splitting coupler 34. The operation of a mode splitting coupler is described in an article, "An analytical Solution for Mode Coupling in Optical Waveguide Branches," by William K. Burns and A. Fenner Milton in the IEEE Journal of Quantum Electronics, Vol. QE-16, No. 4, April 1980. The signal of the fundamental mode of the waveguide 17 is delivered to the single-mode waveguide 20, and the second mode signal of the waveguide 17 is delivered to the single-mode waveguide 18. The signals from waveguides 20 and 18 are delivered to opposite ends of the sensing coil 22, and they return to the waveguide 17 through waveguides 18 and 20, respectively. The returning signals excite the two modes in the waveguide 17 (The returning signal in guide 20 excites the first mode of waveguide 17, and the returning signal in the guide 18 excites the second mode of the waveguide 17.). The returning modes excite the single-mode waveguides 24, 26, 28 and 16.

The two modes in the waveguide 17 travel at different speeds. Thus, they change relative phase during their travel along the waveguide. Note, however, that they travel the same distance in both directions, and although they are completely out of phase when they are delivered to the waveguide 16, the signal arriving at the detector 30 on the outer end of the waveguide 16 is back in phase except for the phase difference created by the angular rotation. The entrance 44 to waveguide 28, however, is a predetermined, experimentally determined, distance along the waveguide from the entrance 46 to waveguide 16, and the entrance 44 is positioned such that the two modes are substantially ninety degrees out of phase with each other. The two detectors 30 and 32 thereby produce two substantially sinusoidal quadrature signals in response to rotation, and they contain all of the necessary information for determining the measured angle.

In summary, the described fiber optics gyro needs no modulator or demodulator, and it produces substantially sinusoidal signals in quadrature that are measures of the sensed angular motion.

We claim:

1. A fiber optic gyro comprising:
   a double-mode optical wave carrier;
   first and second substantially identical single-mode optical wave carriers substantially symmetrically coupled by their first ends to a first end of said double-mode carrier;
   third and fourth single-mode carriers forming a mode-splitter, mode-coupled by their first ends to the second end of said double-mode carrier;
   a fiber optic rotation sensing coil connected at its opposite ends to the second ends of said third and fourth single-mode carriers;
   an at least partially coherent light source coupled to the second end of said first light carrier; and
   a light detector coupled to the second end of said second light carrier.

2. Apparatus as recited in claim 1 in which said carriers are optical waveguides on a substrate.

3. Apparatus as recited in claim 1 in which said carriers are optical fibers.

4. Apparatus as recited in claim 1 and further comprising a fifth single-mode light carrier, whose first end is positioned along said double-mode waveguide away from the second end to said second light carrier, by a distance which produces a signal at the second end thereof that is in quadrature with the signal produced at the first end of said second light carrier.

5. Apparatus as recited in claim 4 in which said light carriers are optical waveguides.

6. Apparatus as recited in claim 4 in which said light carriers are optical fibers.

7. Apparatus as recited in claim 4 and further comprising at least one additional single-mode light carrier, positioned along said double-mode carrier.

8. Apparatus as recited in claim 7 and further comprising at least one detector coupled to receive light from at least one of said additional carriers.

* * * * *